United States Patent
Sherwin et al.

(10) Patent No.: US 6,309,001 B1
(45) Date of Patent: Oct. 30, 2001

(54) ARTICLE PIERCING END EFFECTOR

(75) Inventors: John P. Sherwin, Wauwatosa; Sohail Anwar, Waukesha, both of WI (US)

(73) Assignee: ABB Flexible Automation, Inc., New Berlin, WI (US)

( * ) Notice: Subject to any disclaimer, the term of this patent is extended or adjusted under 35 U.S.C. 154(b) by 0 days.

(21) Appl. No.: 09/515,018

(22) Filed: Feb. 29, 2000

Related U.S. Application Data

(60) Provisional application No. 60/122,178, filed on Mar. 1, 1999.

(51) Int. Cl.$^7$ .................................................. B25J 15/12
(52) U.S. Cl. ........................... 294/61; 294/87.1; 294/100
(58) Field of Search ....................... 294/50.5, 61, 86.4, 294/87.1, 87.12, 88, 94, 95, 99.1, 100, 105, 107, 116, 120; 271/18.3; 901/36–39

(56) References Cited

U.S. PATENT DOCUMENTS

| | | | |
|---|---|---|---|
| 879,801 | * | 2/1908 | Swanson ........................... 294/87.12 |
| 1,184,372 | * | 5/1916 | Nalley ............................... 294/87.12 |
| 1,501,965 | | 7/1924 | Moors . |
| 2,177,595 | * | 10/1939 | Freed ................................. 294/87.12 |
| 2,585,302 | | 2/1952 | Du Bois . |
| 2,792,253 | * | 5/1957 | Bliss .................................... 294/100 |
| 3,050,327 | * | 8/1962 | Kuntz .................................. 294/50.5 |
| 4,130,314 | * | 12/1978 | Storm .................................. 294/100 |
| 4,214,741 | * | 7/1980 | Crawford .......................... 294/61 X |
| 4,372,548 | | 2/1983 | Aurich et al. . |
| 4,386,770 | * | 6/1983 | Hellin ................................ 294/61 X |
| 4,623,184 | | 11/1986 | Houston . |
| 4,805,949 | | 2/1989 | Conway . |
| 4,828,309 | * | 5/1989 | Germaine ............................ 294/100 |
| 4,911,491 | | 3/1990 | Naaktgeboren . |
| 5,727,832 | | 3/1998 | Holter . |
| 5,765,975 | | 6/1998 | Hoffmann et al. . |
| 5,777,267 | | 7/1998 | Szydel . |
| 5,790,401 | | 8/1998 | Shields . |
| 5,833,147 | | 11/1998 | Fuhlbrigge . |
| 5,984,623 | | 11/1999 | Smith et al. . |
| 6,024,349 | | 2/2000 | Hoffmann et al. . |
| 6,039,375 | | 3/2000 | Bauman . |

FOREIGN PATENT DOCUMENTS

| | | | | |
|---|---|---|---|---|
| 2919097 | * | 11/1979 | (DE) | ...................................... 294/61 |
| 3011837 | * | 10/1981 | (DE) | .................................... 294/100 |
| 3331093 | * | 3/1985 | (DE) | ...................................... 294/61 |

* cited by examiner

*Primary Examiner*—Johnny D. Cherry
(74) *Attorney, Agent, or Firm*—Nicholas A. Kees; Godfrey & Kahn, S.C.

(57) ABSTRACT

An article piercing end effector for an industrial robot. The end effector includes a mounting bracket designed to be coupled to the arm of a robot. Positioned on the bracket is an actuator that is coupled to and controls the movement of a first plate. The first plate is supported by two guide rods coupled to the actuator. The first plate includes a plurality of pairs of opposed forks removably mounted to its underside of the first plate. Positioned below the first plate is a second plate with a plurality of holes generally aligned with the tips of each of the pair of opposed forks. The second plate is fixedly attached to the mounting bracket by standoff rods. When the first plate is moved by the actuator toward the second plate, the forks extending from the first plate travel through the holes in the second plate, which holes are chamfered for easy operation. The tips of the forks thus move towards each other to pierce items of interest, such as baked goods positioned below the second plate. The pierced items are thus held by the pairs of opposed forks and may be moved from one location to another. To remove the items from the end effector, the first plate is moved away from the second plate, causing the forks to be removed from the items as the items come in contact with the bottom surface of the second plate.

21 Claims, 4 Drawing Sheets

ARTICLE PIERCING END EFFECTOR

CROSS-REFERENCE TO RELATED APPLICATION

This application claims the benefit of U.S. Provisional Application Ser. No. 60/122,178, filed Mar. 1, 1999.

FIELD OF THE INVENTION

The present invention relates to end effectors used with robots, and more particularly, to an end effector that pierces the articles that are to be picked up and handled by the robot.

BACKGROUND OF THE INVENTION

Robots carry out tasks with speed, accuracy, and repeatability that can not be matched by manual techniques. They are used in a variety of applications, from welding to picking up and handling all sorts of items. In order to carry out these tasks, robots are equipped with "end effectors," devices designed to effect a desired action. End effectors often take the form of mechanical fingers, claws, or jaws that mechanically compress articles between two members. While these types of end effectors (sometimes called "grippers") are effective for use in industrial environments and to manipulate objects that are hard and relatively heavy, they are not useful for handling lighter, delicate, or easily crushed items.

In the food industry, many item s that need to be handled, such as baked goods, are soft and fragile. Most end effectors with mechanical grippers would crush these items during handling. Thus, the advantages of robotic automation are not fully available for many items in the food industry. However, if an end effector existed that did not crush or damage such items, the benefits of robotic automation could be realized. Accordingly, there is a need for an end effector designed to grasp delicate items such as baked goods.

SUMMARY OF THE INVENTION

It is an objective of the present invention to provide a robot end effector that can grasp baked foods without crushing them. This objective and others are achieved in an end effector having, in one embodiment, two opposed forks pivotally mounted to a first plate. In this embodiment each fork is made from a single piece of heavy wire having a cross member with two curved tines extending downwardly therefrom. The first plate is coupled to an actuator by guide rods. The actuator is mounted on a bracket or similar mechanism that functions to couple the end effector to the arm of an industrial robot. The first plate has a plurality of clearance openings, each of which receives a standoff rod.

A second bottom plate is fixed to the ends of the standoff rods attached to the mounting bracket by fasteners extending through the standoff rods. The second plate includes a plurality of holes extending through the plate. The holes in the second plate are aligned with the tines of the forks of the first plate. The first plate is movable by the actuator between an open position, relatively far from the second plate, and a closed position, relatively nearer the second plate. As the first plate is moved toward the second plate, then, the tines are slid through the holes in the second plate. As the first plate is lowered from an open position to a closed position, the curvature of the tines interacts with the holes to cause the tips of the tines to move toward each other and pierce any item that is positioned below the bottom plate. Once pierced, the items may be picked up and moved to a desired location. When the support plate is raised, the tines are withdrawn from the pierced items and the items drop away from the end effector.

Since the present invention uses piercing members to grip items, the items are not subjected to the mechanical compression and contact associated with most common grippers. Thus, the invention provides a solution to the need for grasping items, such as foods, that cannot withstand typical compression and contact forces. One use for this end effector is to remove bakery products from pans. It could, however, be applied to other products, food or otherwise.

Various other features, objects, and advantages of the invention will be made apparent to those skilled in the art from the following detailed description and accompanying drawings.

DESCRIPTION OF THE PREFERRED EMBODIMENTS

Figure 1:
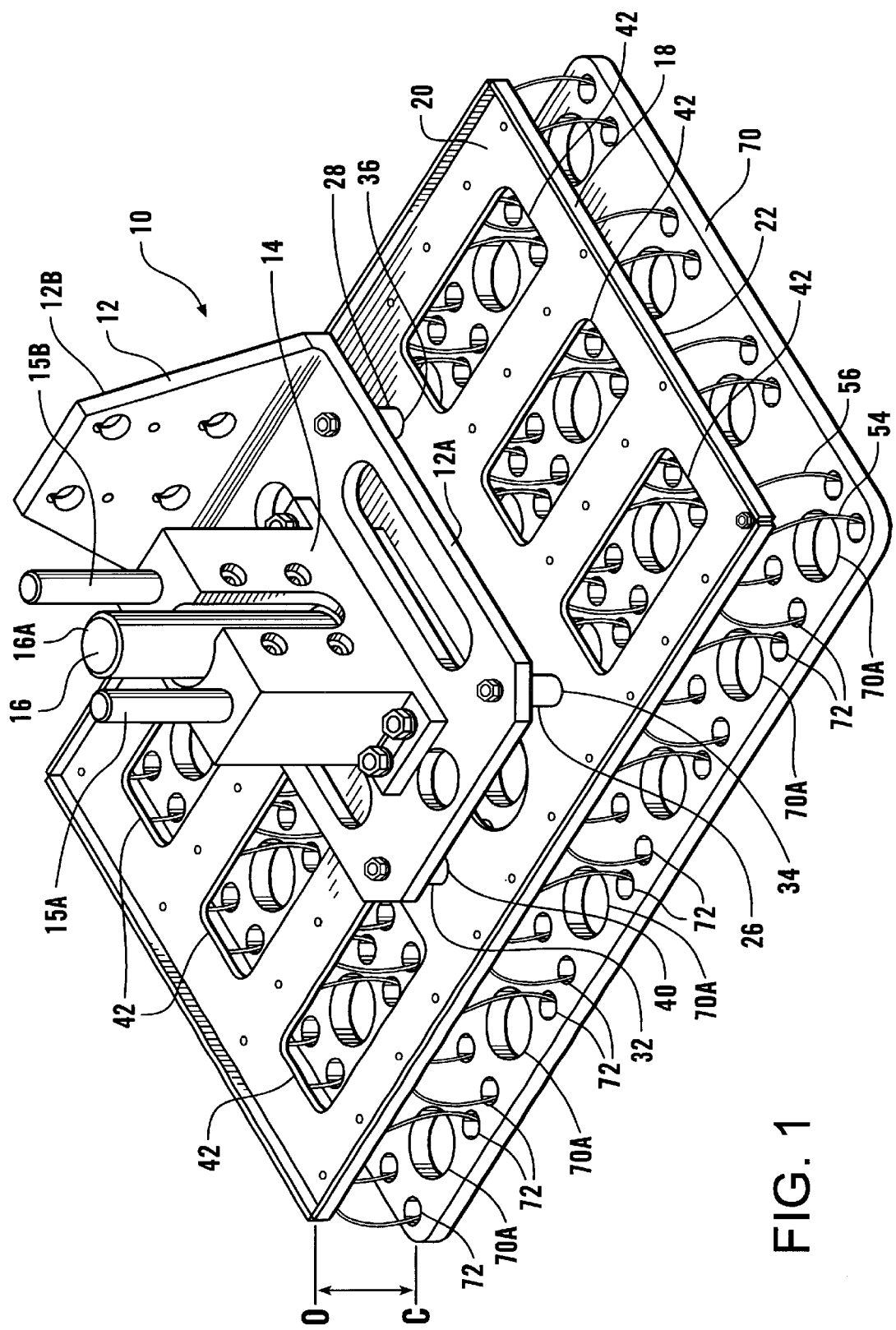
FIG. 1 is an isometric view of an end effector constructed in accordance with the teachings of the present invention.

An end effector 10 constructed in accordance with the present invention is shown in FIG. 1. The end effector 10 includes an L-shaped mounting bracket 12 having a horizontal portion 12A and a vertical portion 12B, the vertical portion 12B being designed to be coupled to the arm of an industrial robot (of a type such as shown in many patents assigned to the assignee of the present application, including, for example, U.S. Pat. No. 5,790,401, the disclosure of which is fully incorporated herein by reference). Mounted to the horizontal portion 12A is an actuator 14, which may be a linear actuator, such as an air or hydraulic liquid actuator of conventional design. In the embodiment shown the actuator 14 includes two guide rods 15A and 15B and a main cylinder 16 having a fluid-driven piston with a piston rod 16A movable within the main cylinder 16. The piston rod 16A and guide rods 15A and 15B are coupled to a first plate 18 having a first surface 20 and a second surface 22.

Figure 4:
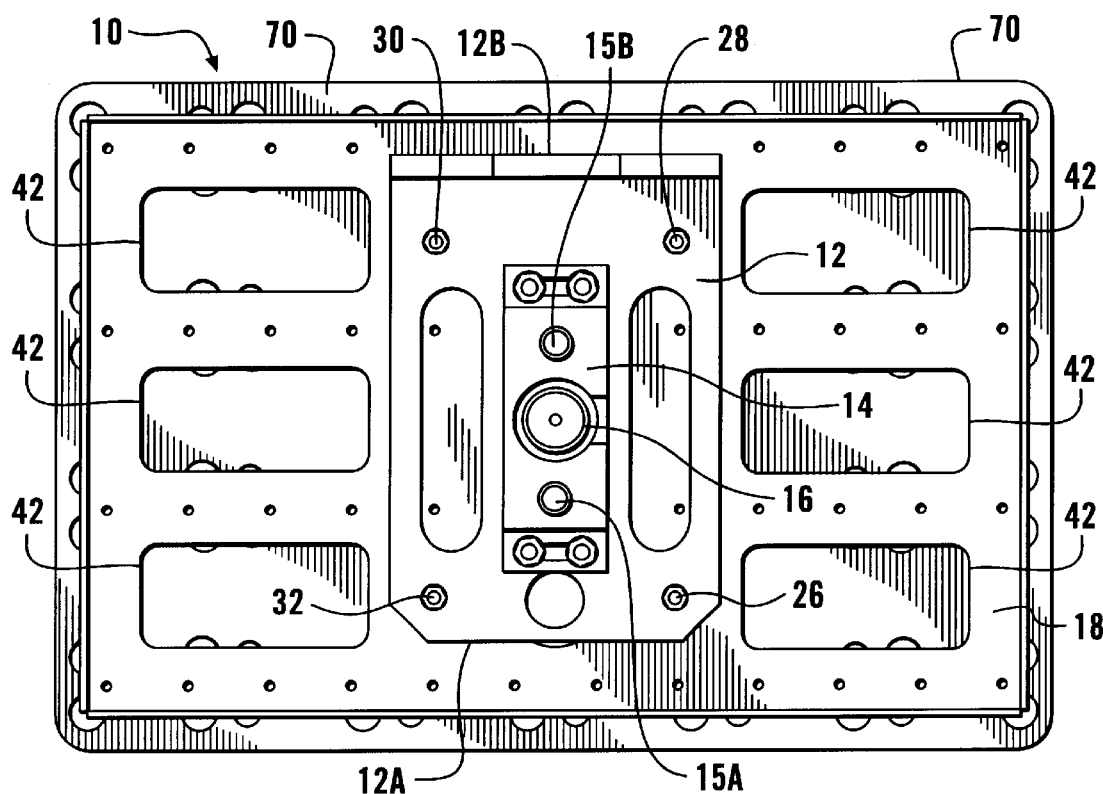
FIG. 4 is a top plan view of the end effector shown in FIG. 1.
Figure 5:
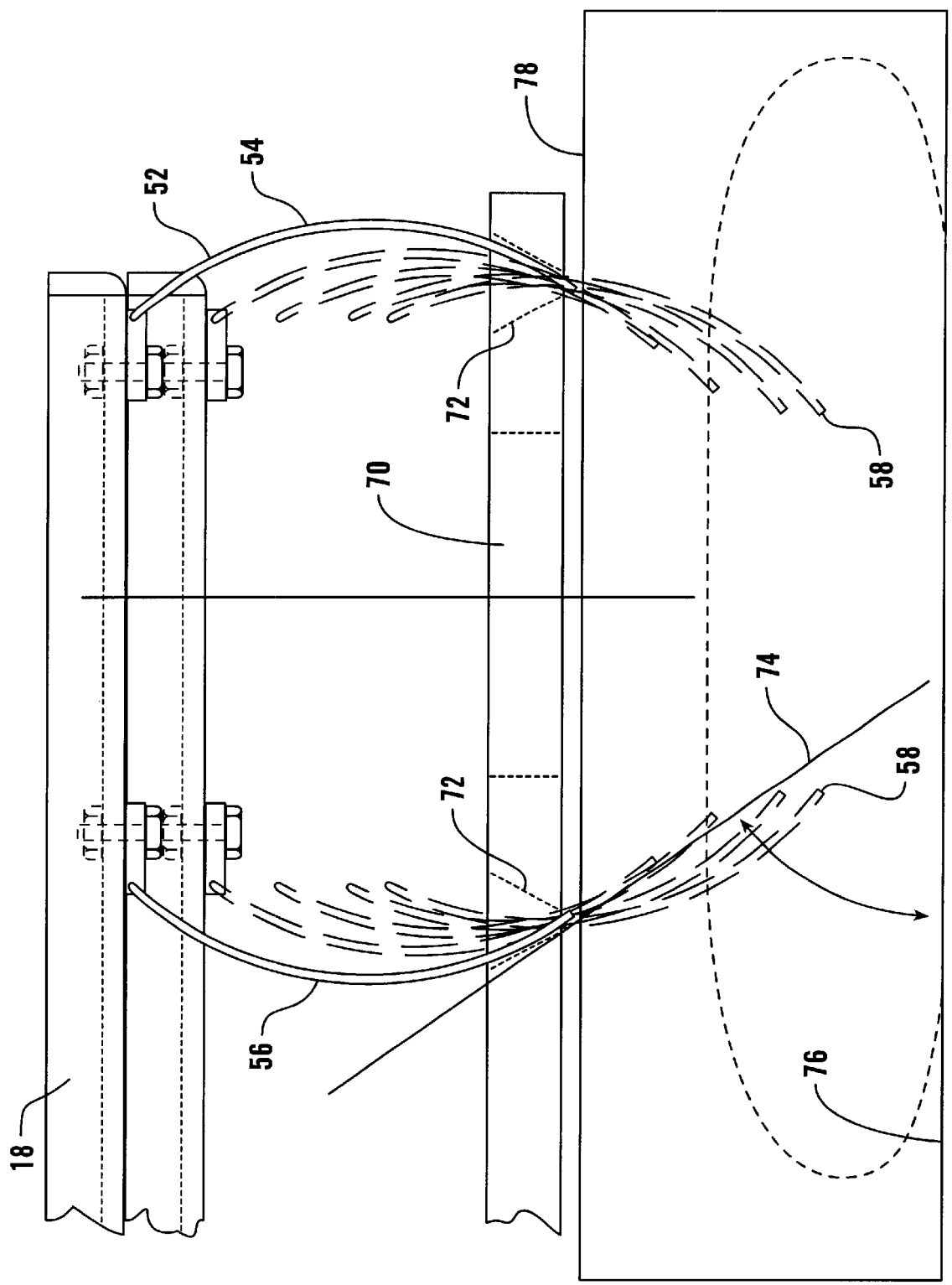
FIG. 5 is an enlarged partial side elevational view of a pair of opposed forks attached to a first plate moving towards a fixed second plate having chamfered holes for the forks to travel through during operation of the end effector.

The first plate 18 is supported by the two guide rods 15A and 15B of the actuator 14. Four standoff rods 26, 28, 30, and 32 positioned between the horizontal portion 12A of the mounting bracket 12 and a second plate 70 are individually received in four clearance holes 34, 36, 38, and 40 in the first plate 18. The actuator 14 in combination with the piston rod 16A and the two guide rods 15A and 15B move the first plate 18 in its motion between an open position O wherein the first plate 18 and the second plate 70 are relatively far apart, and a closed position C, wherein the first plate 18 and the second plate 70 are relatively closer together. In the most preferred embodiment, the first plate 18 further includes a plurality of air movement openings 42 to allow air to flow through the end effector 10, as shown in FIGS. 1 and 4. FIG. 5 illustrates the preferred embodiment of the first or top plate 18 movable between an open position O and a closed position C with respect to the fixed bottom or second plate 70.

Figure 2:
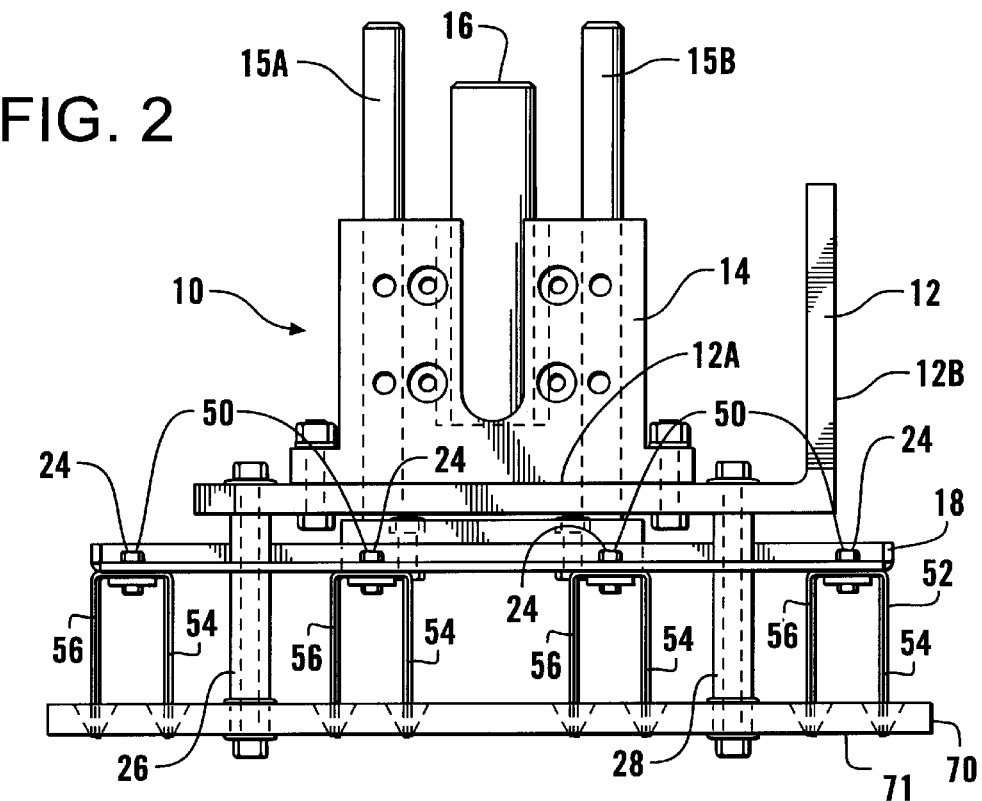
FIG. 2 is a side elevational view of the end effector shown in FIG. 1.
Figure 3:
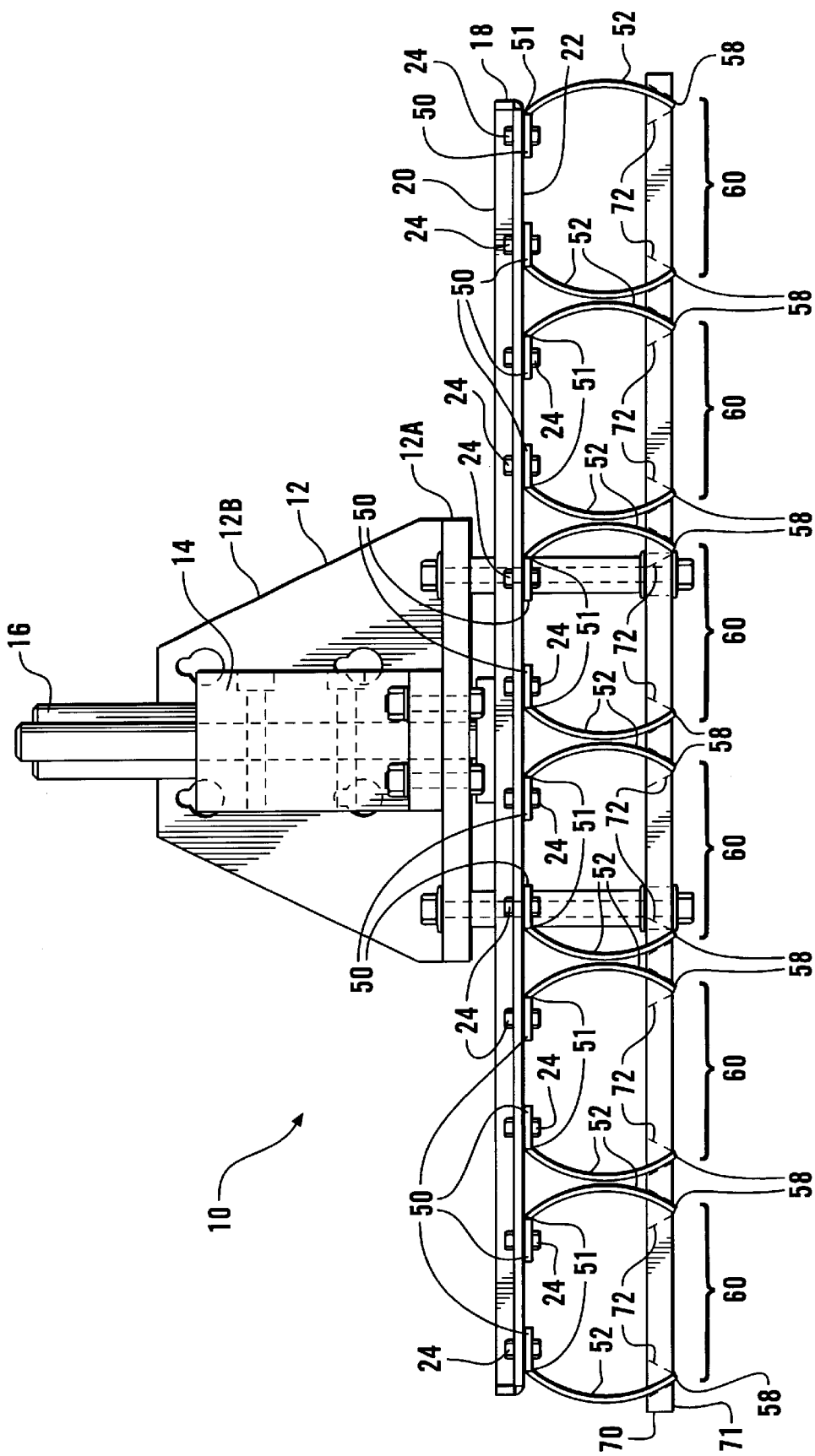
FIG. 3 is a front elevational view of the end effector shown in FIG. 1.

Referring next to FIGS. 2 and 3, mounted to the second surface 22 of the first plate 18 are a plurality of retainer blocks 50 for holding a plurality of forks 52. The retainer blocks 50 are removably attached to the second surface 22 of the first plate 18 by fasteners 24. The forks 52 are preferably flexible members having an inverted U-shape, with a horizontal portion and at least one and preferably two curved tines 54, 56 extending downwardly from the horizontal portion. In the embodiment shown, each retainer block 50 has a groove or channel 51 formed therein for holding the horizontal portion of the forks 52 when fastened to the second surface 22 of the first plate 18. The retainer blocks 50 are preferably constructed from plastic, but may be constructed from any suitable material. The forks 52 are preferably made of stainless steel or any other suitable material which is flexible, hard, yet easy-to-clean.

In the configuration shown in FIG. 3, each fork 52 is paired with another fork 52 to form a pair of opposed forks 60. The pairs of opposed forks 60 attached to the second surface 22 of the first plate 18 are positioned so that the curved tines 54, 56 of each fork 52 in the pair 60 are curved concavely with respect to the opposite pair. In this position, the tips 58 of the curved tines 54, 56 of each fork 52 in the pair 60 are substantially pointing towards each other. In the preferred embodiment shown in FIG. 1, the end effector 10 includes a matrix of 24 pairs of forks 60, but the invention could be implemented with any number of pairs of forks.

As shown in the drawings, the second plate 70 is positioned below and in facing relation to the first plate 18. The second plate 70 is fixed to the horizontal portion 12A of the mounting bracket 12 by fasteners extending through the standoff rods 26, 28, 30, and 32. The standoff rods 26, 28, 30 and 32 are positioned between the bottom surface of the horizontal portion 12A of the mounting bracket 12 and the top surface of the second plate 70. Like the first plate 18, the second plate 70 may have a plurality of air movement openings 70A to allow air flow through the end effector 10. The second plate 70 also has a bottom surface 71. The second plate 70 further includes a plurality of holes 72 extending therethrough for guiding the curved tines 54, 56 of the forks 52 toward items to be pierced and picked up by the end effector. In the most preferred embodiment, each of the holes 72 is chamfered for easier operation. The positions of the chamfered holes 72 in the second plate 70 correlate to the positions of the pairs of forks 60 secured to the second surface 22 of the movable first plate 18 by the retainer blocks 50. Specifically, each chamfered hole 72 is positioned so that the tip 58 of each tine 54, 56 is positioned within a chamfered hole as the first plate 18 moves toward the second plate 70.

The operation of the end effector is shown in FIG. 5. When the movable first plate 18 moves towards the fixed second plate 70, the curvature of the tines 54, 56, interacts with the holes 72 to cause the tips 58 of the forks 52 to move toward each other. Alternatively stated, the position and curvature of the tines 54, 56 and the relative positioning of the holes 72 is such that as the first plate 18 moves toward the second plate 70, the tips 58 of the curved tines 54, 56 move approximately along respective opposing inwardly angled lines 74 with respect to a longitudinal axis 76. The most preferable angle of lines 74 is approximately 45 degrees with respect to longitudinal axis 76, but other angles may also be used, depending upon the particular application. If items to be moved, such as bakery items, are positioned below the second plate 70, the action of the forks 52, in each pair of forks 60, moving toward each other, causes the tips 58 to move together and pierce the items, thereby holding the items in the tines 54, 56. The pierced items held between each pair of forks 60 may be moved from one location, such as from a bakery pan 78, to a second, desired location such as a conveyor belt for packaging the items. Once at the desired location, the first plate 18 is raised, causing the forks 52 to move away from each other, again along angled lines 74, and to thereby be removed from the pierced items as the pierced items come in contact with the bottom surface 71 of the second plate 70. As the forks 52 are removed, the items drop away from the end effector 10.

As can be seen from the above discussion, one of the unique features of the present invention is that the end effector pierces the articles to be handled. This piercing action avoids the need to use a compression-type gripper, which would crush or mar the baked goods in an unacceptable way. And, although the end effector creates small holes in the items handled, they are often undetectable or, if desired, can be covered by frosting or the like. Thus, very fragile items such as baked goods can be handled using robots, taking advantage of their speed and accuracy in completing redundant tasks.

As should be apparent from the discussion above, the end effector can be configured in multiple ways with various matrices or assortments of pairs of forks. Further, while the present invention may be used in the food industry and constructed from sanitary materials such as stainless steel, the end effector may be constructed from a variety of materials and used in applications other than baked goods. Thus, the present invention is not limited to the specific details discussed herein, but embraces all forms that come within the scope of the following claims.

We claim:

1. An end effector comprising:
    a bracket capable of being coupled to a robot;
    a first plate coupled to the bracket, the first plate having a first top surface and a second bottom surface, the second surface having a plurality of forks attached thereto;
    a second plate located in facing relation to the first plate and connected to the bracket, the second plate having a plurality of guiding holes positioned generally in line with the forks attached to the second surface of the first plate; and
    wherein the first plate is movable by an actuator between an open position relatively far from the second plate and a closed position closer to the second plate.

2. The end effector of claim 1, wherein the bracket is an L-shaped mounting bracket having a horizontal portion connected to the actuator and a vertical portion designed to be coupled to a robot arm.

3. The end effector of claim 1, wherein the actuator includes at least two guide rods and a main cylinder having a fluid-driven piston with a piston rod movable within the main cylinder.

4. The end effector of claim 3, wherein the first plate is supported by the at least two guide rods and moved by the piston.

5. The end effector of claim 1 wherein the second plate is fixed to the bracket with at least two standoff rods.

6. The end effector of claim 5, wherein the first plate includes at least two clearance holes formed therein, each clearance hole receiving one of the standoff rods to allow movement of the first plate between the bracket and the second plate.

7. The end effector of claim 1, wherein the forks are removably attached to the second surface of the first plate by retainer blocks.

8. The end effector of claim 7, wherein each fork is an inverted U-shaped member with a horizontal portion and at least two curved tines extending downwardly from the horizontal portion.

9. The end effector of claim 8, wherein each retainer block includes a groove formed therein for holding the horizontal portion of the forks when fastened to the second surface of the first plate.

10. The end effector of claim 1, wherein each fork is paired with another fork to form pairs of opposed forks when attached to the first plate.

11. The end effector of claim 10, wherein the pairs of opposed forks are positioned so that the curved tines of each fork in the pair are curved concavely with respect to the opposite fork, so that the tips of the forks are substantially pointed toward each other.

12. The end effector of claim 1, wherein the guiding holes are chamfered for guiding the tines of the forks through the holes when the first plate moves toward the second plate.

13. The end effector of claim 12, wherein, the tips of the curved tines move approximately along a 45 degree line with respect to a longitudinal axis as the first plate moves toward the second plate and the tines extend through the guide holes in the second plate.

14. An end effector for use with a robot, the end effector comprising:

a bracket capable of being coupled to a robot arm;

an actuator mounted to the bracket;

a plurality of standoff rods mounted to the bracket;

a first plate coupled to the actuator, the first plate having a plurality of clearance holes formed therein, and first and second surfaces, each clearance hole receiving one of the standoff rods and the second surface having a matrix of pairs of opposed forks mounted on the second surface, each fork having at least two curved tines, and tips at the ends of the tines;

a second plate fixed to the standoff rods mounted to the bracket, the second plate having a plurality of holes formed therein and positioned to correspond with the matrix of pairs of opposed forks, so that the tips from each of the tines is positioned at least partially within each of the holes; and wherein the first plate is movable by the actuator from an open position to a closed position with respect to the second plate.

15. The end effector of claim 14, wherein the curvature of the tines coacts with the holes to cause the tines in each pair of opposed forks to move toward each other as the first plate moves toward the closed position.

16. The end effector of claim 15, wherein the tips of the tines in each pair of opposed forks move toward each other approximately along a 45 degree line with respect to a longitudinal axis as the first plate is moved toward the second plate by the actuator.

17. The end effector of claim 14, wherein the holes are chamfered and wherein the curvature of the tines coacts with the chamfered holes to cause the tines in each pair of opposed forks to move toward each other as the first plate moves toward the closed position.

18. The end effector of claim 14, wherein the forks and first and second plates are constructed from stainless steel.

19. The end effector of claim 14, further comprising a plurality of retainer blocks mounted to the second surface of the first plate, wherein each block includes a channel formed therein for holding one of the plurality of forks.

20. An end effector comprising:

a bracket capable of being coupled to a robot;

an actuator mounted to the bracket;

a plurality of standoff rods mounted to the bracket;

a first plate coupled to the actuator, the first plate having a plurality of clearance holes formed therein for receiving one of the plurality of standoff rods, and first and second surfaces, the second surface having a plurality of pairs of opposed forks removably mounted to the second surface, and each fork having at least one curved tine; and a second plate fixed to the standoff rods attached to the bracket, the second plate positioned in facing relation to the first plate and having a plurality of guiding holes extending through the plate to allow the plurality of pairs of opposed forks to travel through the holes.

21. The end effector of claim 20, wherein the guiding holes are chamfered and positioned below the forks so that each tine is at least partially within each of the chamfered guiding holes as the first plate moves toward and away from the second plate during operation of the end effector.

* * * * *